United States Patent [19]
Crevasse

[11] Patent Number: 4,719,116
[45] Date of Patent: Jan. 12, 1988

[54] SMOKED MEAT PRODUCT AND METHOD AND APPARATUS FOR MAKING THE SAME

[75] Inventor: Gary A. Crevasse, Rochester Hills, Mich.

[73] Assignee: Naturin-Werk Becker & Co., Fed. Rep. of Germany

[21] Appl. No.: 900,817

[22] Filed: Aug. 27, 1986

[51] Int. Cl.⁴ .............................................. A23B 4/04
[52] U.S. Cl. .................... 426/315; 426/513; 426/646
[58] Field of Search ............... 426/315, 513, 644, 646, 426/272, 138, 140, 129, 105; 17/49, 45

[56] References Cited

U.S. PATENT DOCUMENTS

| | | | |
|---|---|---|---|
| 2,037,355 | 4/1936 | Vogt | 426/646 |
| 2,747,228 | 5/1956 | Braun et al. | 264/212 X |
| 2,981,973 | 5/1961 | Elmore | 426/513 X |
| 3,014,024 | 12/1961 | Liberman et al. | 264/311 |
| 3,290,841 | 12/1966 | Sartore | 17/35 |
| 3,344,467 | 10/1967 | Barbu | 17/38 |
| 3,477,860 | 11/1969 | Sartore | 99/174 |
| 3,595,682 | 7/1971 | Lind | 426/315 |
| 3,664,849 | 5/1972 | Autry | 426/294 X |
| 4,285,980 | 8/1981 | Lewis | 426/513 X |
| 4,621,482 | 11/1986 | Crevasse | 53/439 |

FOREIGN PATENT DOCUMENTS

3023983  1/1982  Fed. Rep. of Germany ...... 426/105

OTHER PUBLICATIONS

Article from "Die Fleischwirtschaft" 63 (1983) 5, p. 786 and English translation.
Canadian patent application serial No. 487,912 entitled "Use of an Edible Flat Collagen Sheet in the Production of Smoked Foodstuffs, Especially Fish Products and Ham" by Winkler, filed Jul. 31, 1985 claiming priority to W. German patent application No. P 34 31 578.0 filed Aug. 28, 1984.
Advertising of JetNet Corporation entitled "Merchandising Rolled Roasts the JetNet Way".

Primary Examiner—Kenneth M. Schor
Attorney, Agent, or Firm—Harness, Dickey & Pierce

[57] ABSTRACT

A method and apparatus for producing a smoked meat product is provided. A mold frame is provided which has an opening. A piece of elastic netting is stretchedly secured over the opening. A piece of edible film is placed on the elastic netting, massaged meat product parts are placed on the film over the opening causing the netting to extend through the opening. A grid secures the parts into the frame. The parts are held under compression by the apparatus during smoking and a unitary smoked meat product is thus produced preferably of turkey meat.

4 Claims, 4 Drawing Figures

SMOKED MEAT PRODUCT AND METHOD AND APPARATUS FOR MAKING THE SAME

TECHNICAL FIELD

The present invention relates to meat products with a smoked flavoring and smoke colored appearance. More particularly, the present invention relates to the manufacture of a product resembling in its final form a smoked turkey breast which has an appetizing smoke colored surface appearance and in addition the method and apparatus for producing this product.

BACKGROUND

It has been a common practice in the preparation of meat products to use several small meat product parts to produce a final larger meat product such as a ham. In this process the meat product parts are first massaged to bring exudates to the surface of the parts and the parts are thereby pressed together and cooked allowing the exudates to act as adhesives for securely binding the parts together through this cooking process. In addition, it has been a common practice in the past to smoke various meat products in a smoke house to give them a smoked taste and in addition to produce an appealing outer surface color on the meat products cooked in this matter.

This smoking process has been used in preparation of products such as hams, poultry and fish products. Manufacturers of turkey meat products have prepared turkey breast meat in various methods. As an example, manufacturers have processed turkey breast meat parts in moisture proof casings thereby cooking the turkey breast parts and forming an integral mass due to the exudates of the turkey meat parts bonding them together. This type of product is of the type generally served on a deli shelf or in a cold cut section of a grocery store and has a very white color with no appealing smoked flavoring or smoke colored surface coating.

SUMMARY OF THE INVENTION

The present invention includes a method for making a smoked meat product comprising the steps of placing an edible film over an opening in a smoke permeable mold. Meat product parts are then placed on top of the edible film and the opening thereby filling the mold. The meat product parts are then wrapped with the edible film and the products are compressed in the mold. The mold is then placed in a smoke house for smoking of the meat product and the mold is removed from the smoke house after a period of time. Then the meat product is removed from the mold. In addition, the present invention includes a smoked meat product which is manufactured in accordance with the above steps. Therefore, a meat product is provided comprising a plurality of turkey meat parts held together by exudates and which have a covering of an edible film with smoke permeating the film and the turkey meat.

Also provided in the present invention is an apparatus for preparation of a smoked meat product from a plurality of meat product parts. The apparatus includes a smoke permeable mold means which has an opening therein. Edible film means is provided for lining the mold means. The edible film is adapted to be wrapped around the meat product parts, which are placed in the mold, and allows for removal of the meat product from the netting after the smoking process. Compression means are provided for retaining the meat product parts under compression during the smoking process and for accentuating internal binding of the parts and shaping the parts into a unitary meat product.

DESCRIPTION OF THE DRAWINGS

Other advantages of the present invention will be readily appreciated as the same becomes better understood by reference to the following detailed description when considered in connection with the accompanying drawings wherein.

BRIEF DESCRIPTION OF THE PRESENT INVENTION

Figure 1:
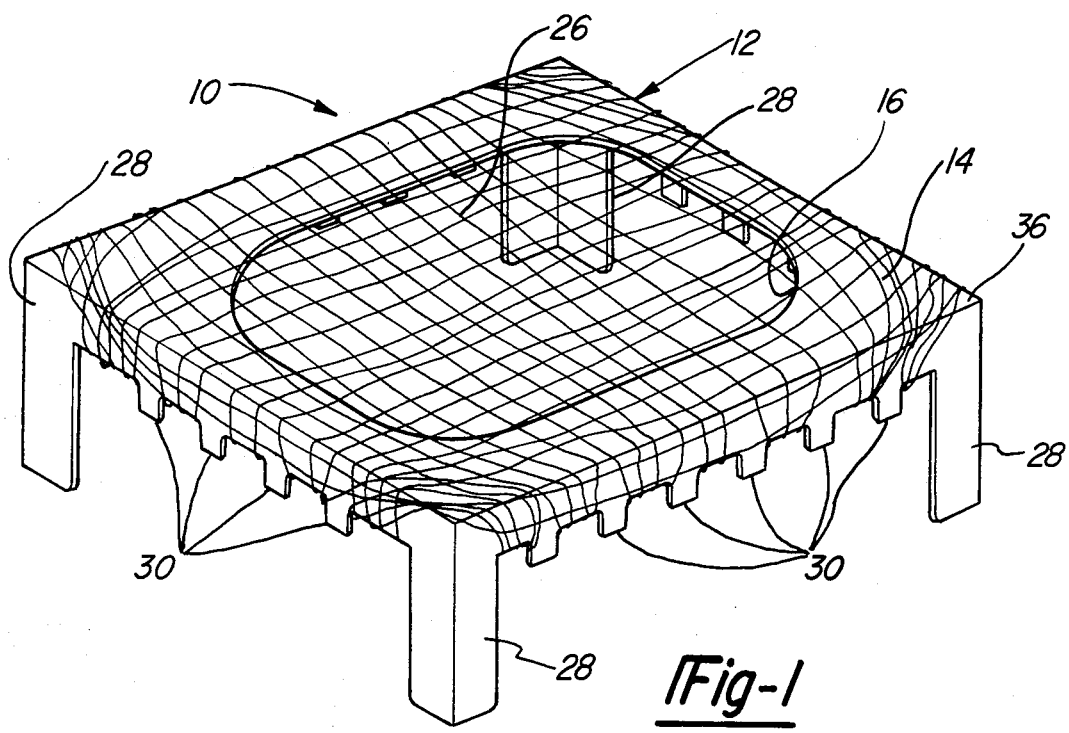
FIG. 1 is a perspective view of the apparatus of the present invention with the elastic netting in position.
Figure 2:
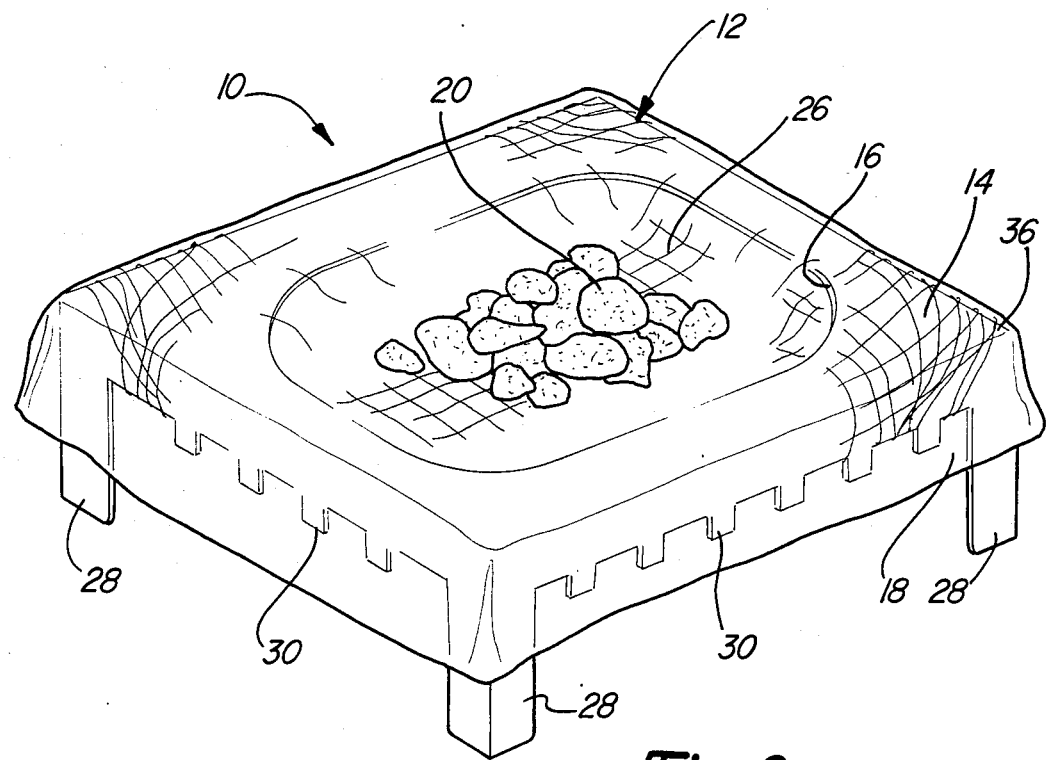
FIG. 2 is a perspective view of the present invention with a collagen food film and meat product parts in position.
Figure 3:
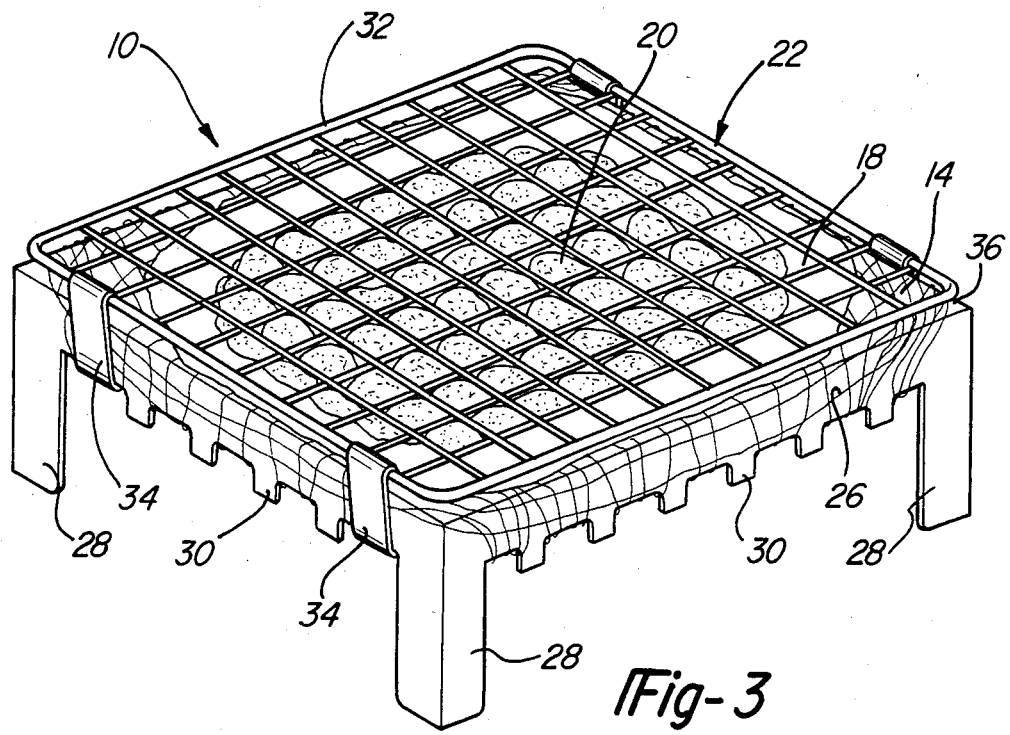
FIG. 3 is a perspective view of the apparatus of the present invention and meat product parts engaged in the apparatus ready for smoking of the product.

An apparatus for preparation of a smoked meat product is generally shown at 10 in FIGS. 1 through 3. As shown in FIG. 1, the apparatus 10 comprises smoke permeable mold, generally indicated at 12, with upper surface 14 having an opening 16 therein. As shown in FIG. 2, an edible film 18 is provided for lining the mold 12 and is adapted to be wrapped around meat products parts 20 which are placed in the mold 12. In addition, compression means generally indicated at 22 in FIG. 3 is provided for retaining the meat product parts 20 under compression during the smoking process for accentuating the internal binding of the parts and shaping of the parts into a unitary meat product which is generally shown at 24 in FIG. 4 before the film skirt 25 surrounding the meat is trimmed off.

The mold 12 of the present invention further comprises an elastic netting 26 which is operatively positioned over the opening 16 for receiving the meat product parts 20. The weight of the parts 20 cause the netting 26 to expand beneath the opening 16 such that the parts begin to take a generally hemispherical shape. As will appear, the final shape of the product is defined by the compressive forces acting on the parts 20 by the elastic netting 26 from the bottom and the compression means 22 from the top.

The mold 12 of the present invention further includes suspension means 28 for supporting the upper surface 14 and also has netting securing means 30 for securing the elastic netting means 26 over the opening 16 in the upper surface 14. In addition, a gridded cover 32 (best shown in FIG. 3) is provided for securing the meat product parts 20 in compression between the elastic netting 26 and the gridded cover 32.

The elastic netting used in the present invention is of the type used for the netting of hams and the like. This type of netting is shipped in a "tube" form. Therefore, use of the netting requires first cutting a length of netting "tube" from the roll and then cutting the tube along one of the longitudinal sides to form a rectangular shaped piece of elastic netting which is then adaptable for stretching over the mold frame. However, other types of elastic netting could be used in the present invention.

In a preferred embodiment of the invention the suspension means are supporting legs 28 at the corners of the mold frame 12 and the netting securing means are a series of fingers 30 aligned for securing engagement with the openings in the netting and are placed on all four sides of the mold frame 12 pointing in a downward direction. The film 18 of the present invention preferably is an edible collagen type film which is smoke permeable in nature and allows retention of a smoke color and smoke flavor during and after the smoking process. An entirely suitable collagen food film has been found to be "COFFI" film available from The Brechteen Co. "COFFI" is a registered trademark of The Brechteen Co. A more detailed description of this film and its uses found in U.S. Ser. No. 724,817 filed Apr. 18, 1985 now U.S. Pat. No. 4,621,482 which is hereby incorporated by reference. However, other types of edible film coatings which are smoke permeable may be used without deviating from the broad scope of the present invention. The opening 16 in a preferred embodiment of the invention comprises an elliptical rounded opening 16. In the present invention, the grid 32 is of a steel construction and has clips 34 for securing the grid on top of the mold frame 36. The grid operatively holds the meat product parts 20 in compression between the grid 32 and elastic netting 26.

The present invention provides a method for making a smoked meat product including the steps of placing an edible film 18 over an opening in a smoke permeable mold 12 and then, placing meat product parts 20 on top of said edible film 18 over said opening thereby filling the mold 12. Meat products are then wrapped with the edible film 18 and compressed in the mold. The mold is then placed in the smoke house for a period and thereafter the mold is removed with the product intact and the meat product is removed from the mold.

It is advantageous in the present invention to "massage" the meat parts prior to placing them in the mold such that they will be held together by the exudates as they are cooked under compression in the smoke house. Preferably, turkey breast meat parts are used in the present invention for producing a smoked turkey breast meat product.

In a preferred embodiment of the invention the smoke permeable mold 12 includes a sheet of elastic netting 26 as disclosed above which is stretchably positioned over the opening 16. The edible film 18, preferably collagen food film, is placed over the opening and the meat products 20 are placed on top of the edible film 18. The weight of the meat products 20 causes the elastic netting to stretch into a generally elongated hemispherical shape. The film 18 is then folded over the meat products 20 completely enclosing them. The rigid grid 32 is then secured to the upper surface of the mold 12 which holds and retains the meat products 20 in compression between the grid 32 and the elastic netting 26. The apparatus with the meat products intact is placed upright into a smoke house on a horizontal shelf to thereby cook and smoke the meat product, allowing for the exudates to adhesively secure the meat product parts together. In such manner, a smoke flavoring and coloring permeates the turkey meat products 20, and which smoke flavoring and coloring is retained by the edible collagen film 18 on the outside of the product. The product is then removed from the smoke house and the mold frame 12. After the removal of the product, it has excess exudates and collagen film in the form of a skirt 25 extending from the flat bottom which is trimmed off to produce the final turkey breast shaped meat product.

Figure 4:
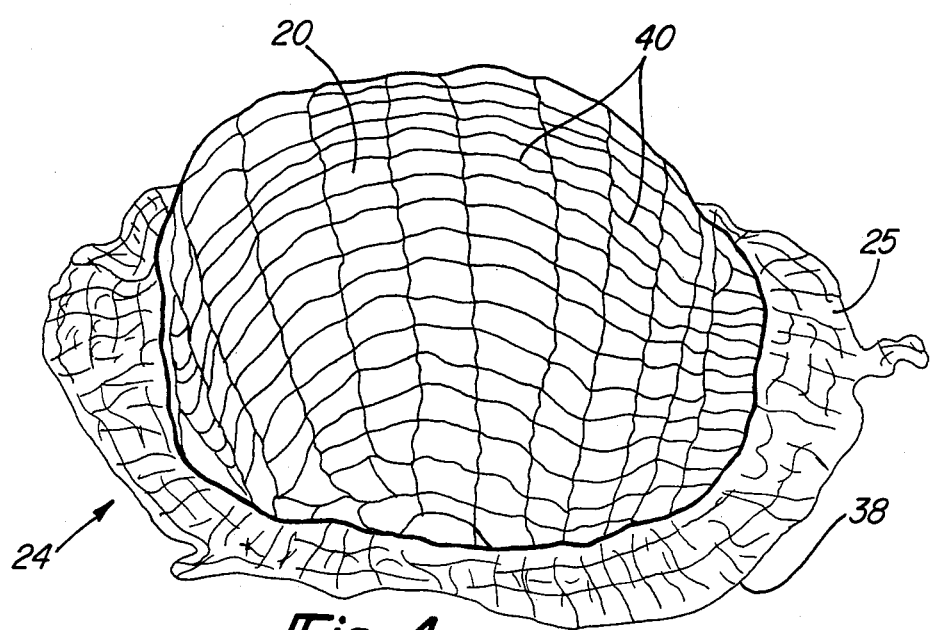
FIG. 4 is a perspective view of the untrimmed product produced by the method and apparatus of the present invention.

The present invention also includes the meat product manufactured by the steps disclosed above. The meat product 24 shown in FIG. 4 is provided which comprises a plurality of turkey meat parts 20 which are held together by exudates of the meat parts and have a covering of an edible film 18, with smoke flavoring permeating the film and the turkey meat. The meat product 24 of the present invention is generally hemispherical in shape. Generally it has an elongated hemispherical shape with a generally flat bottom 38 and preferably the shape of the meat product 24 is a turkey breast like shape and the rounded side of the product has indentations 40 which form a grid therein. In addition, the meat product of the present invention has smoked color on the outside through the use of the collagen film since the film will retain this color.

For purposes of more specifically describing the present invention the following example is disclosed by way of illustration and not limitation.

EXAMPLE

A smoked turkey breast shaped meat product is produced by the following steps.

1. Prepare turkey breast meat parts by pumping one to five pound pieces of turkey breast meat to 10% over the green weight with curing pickle, having the formula of 50 gallons of water mixed with 15 pounds of sugar, 53 pounds of salt and 13½ ounces of sodium nitrate.

2. Place the pieces in a suitable container containing the above solution and hold them overnight at a temperature 30° to 40° F.

3. Place the turkey parts and curing pickle solution into a massager and massage the parts at a medium speed for 30 minutes to develop an exudate coating on the pieces which is tacky to the touch;

4. Transfer the turkey parts to a suitable holding container in preparation for final use;

5. Stretch a 10"×12" piece of elastic netting over the molding frame 36 by securing the netting to the fingers 28 around the fringe of the mold frame thereby the netting provides a resistance when depressed into the hole 16 in the frame 36;

6. Center a 18"×22" sheet of collagen food film 18 over the opening 26 on the frame 36.

7. Add six to seven pounds of turkey meat parts 20 which will thereby depress the netting film and meat into the frame.

8. Cover the exposed meat product parts with the excess collagen food film and place and secure the grid 22 in place on the frame.

9. Place the loaded frame on a flat screen in a smoke tree and place the assembly in a smoke house for cooking and smoking of the meat at a temperature of 130° F.

10. Hold at 130° F. for two hours with the dampers of the smoke house open.

11. Set the dampers one-quarter open and raise the temperature in the smoke house to 140° F. and introduce smoke for one hour to the smoke house.

12. Raise the temperature 165° F. and hold this temperature in the smoke house until internal temperature of 155° F. inside of the meat is reached.

13. Shower the frame and meat product for two minutes and cool to room temperature and an internal temperature of the meat product of 110° F.

14. Remove the product from the frame and trim off excess exudates.

15. Place in a cooler and chill to 36° F. and chill the product overnight.

The invention has been described in an illustrative manner using words of description and is not intended to be limiting in any way. Obviously, many modifications and variations of the present invention are possible in light of the above teachings. It is therefore to be understood, that within the scope of the pending claims the invention may be practiced otherwise then previously described.

What is claimed is:

1. The method for making a smoked meat product comprising:
    (a) placing an edible film on an elastic netting secured over an opening in a smoke permeable mold;
    (b) placing meat product parts on top of said edible film over said opening to fill said net;
    (c) wrapping said meat products with said edible film;
    (d) compressing the meat product parts in said mold;
    (e) placing the mold in a smoke house and keeping the mold in the smoke house for sufficient time to smoke the meat;
    (f) removing the mold from the smoke house after said period of time to smoke the meat; and
    (g) removing the meat product from the mold.

2. The method according to claim 1 wherein said meat product parts have been previously massaged.

3. The method according to claim 1 wherein the meat product parts comprise turkey meat.

4. A method for making a smoked meat product comprising the steps of:
    (a) securing an elastic netting over an opening in a mold frame having an upper surface;
    (b) placing a sheet of edible collagen film on said elastic netting and over said opening;
    (c) depositing massaged meat product parts upon said film over said opening wherein the weight of said meat product parts cause said elastic netting to stretch into a generally elongated hemispherical shape;
    (d) folding the edges of said film over the top of said meat products to fully enclose said meat products;
    (e) compressing said meat products into said netting by securing a rigid grid to said upper surface of the mold;
    (f) placing the mold in a smoke house for a sufficient time for cooking and smoking of said meat products; and
    (g) removing said meat product from said mold and trimming excess collagen film and exudates from said meat product.

* * * * *